United States Patent

[11] 3,607,914

| [72] | Inventors | Bernhard Stouthamer;<br>Arien Kwantes, both of Amsterdam, Netherlands |
|---|---|---|
| [21] | Appl. No. | 825,251 |
| [22] | Filed | May 16, 1969 |
| [45] | Patented | Sept. 21, 1971 |
| [73] | Assignee | Shell Oil Company<br>New York, N.Y. |

[54] PREPARATION OF ESTERS BY CARBONYLATION OF ETHERS
13 Claims, 1 Drawing Fig.

[52] U.S. Cl. .................................................. 260/496,
260/410, 260/410.5, 260/410.9 R, 260/468 CB, 260/469, 260/476 R, 260/479 P

[51] Int. Cl. .......................................................... C07c 67/00
[50] Field of Search .......................................... 260/496, 476 R, 468 CB, 410.9 R, 479, 410, 410.5, 469

[56] References Cited
UNITED STATES PATENTS

| 1,864,643 | 6/1932 | Dreyfus et al. | 260/496 |
|---|---|---|---|
| 2,135,447 | 11/1938 | Woodhouse | 260/496 |
| 3,449,408 | 6/1969 | Schultz | 260/468 |
| 3,127,438 | 3/1964 | Friedman et al. | 260/468 |

*Primary Examiner*—Lewis Gotts
*Assistant Examiner*—Vivian Garner
*Attorneys*—John H. Colvin and Walter Mark

ABSTRACT: Esters are prepared by reacting carbon monoxide with an ether in the presence of water-containing liquid fluoride.

PATENTED SEP 21 1971 3,607,914
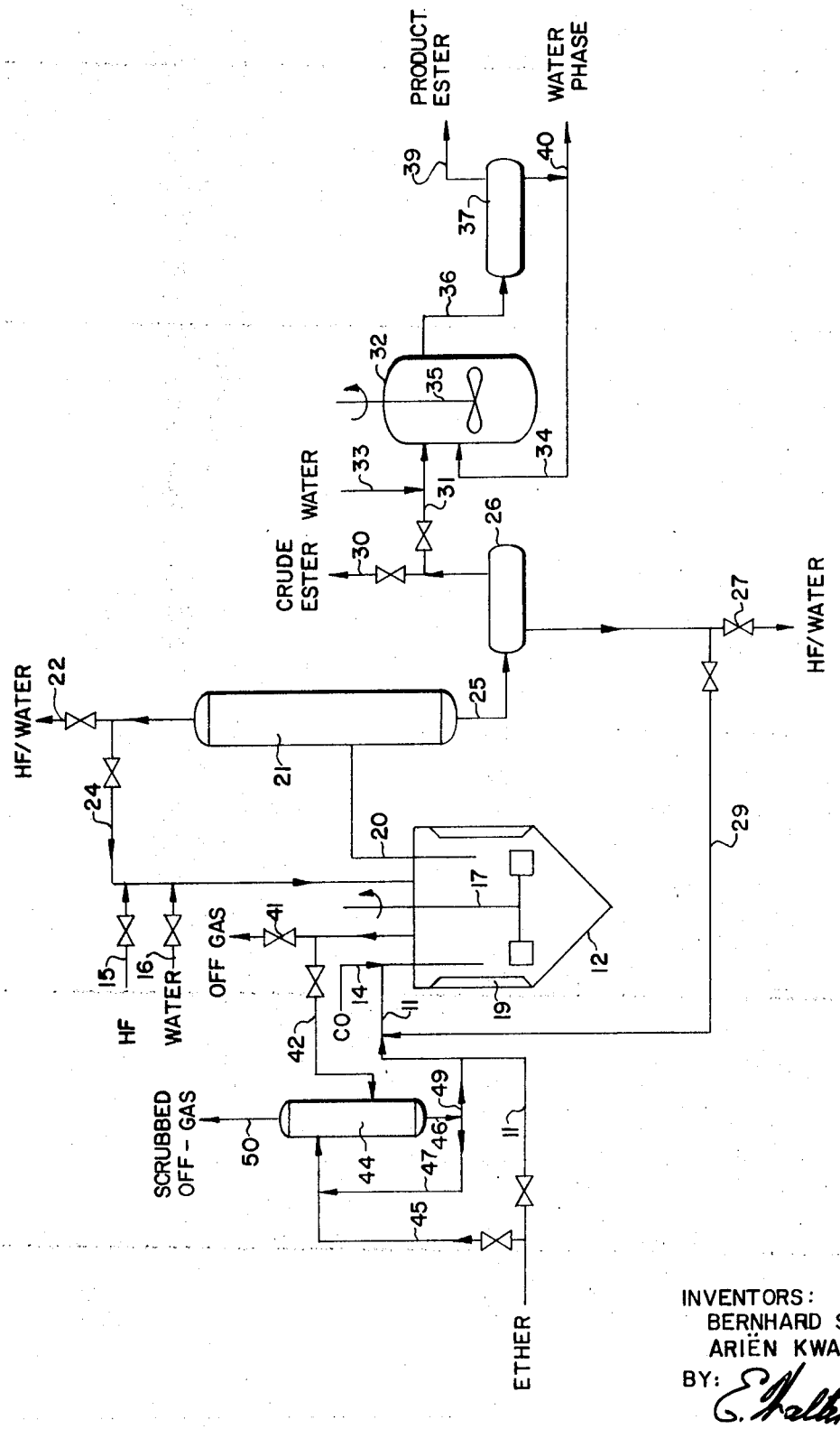
INVENTORS:
BERNHARD STOUTHAMER
ARIEN KWANTES
BY: E. Walter Mach
THEIR ATTORNEY

PREPARATION OF ESTERS BY CARBONYLATION OF ETHERS

BACKGROUND OF THE INVENTION

This invention relates to the production of esters. The invention relates more particularly to the production of esters from starting materials comprising carbon monoxide and ethers in the presence of liquid hydrogen fluoride, containing a minor amount of water, as catalyst.

U.S. Pat. No. 2,913,489 to De Benedictis et al. discloses a process for the production of esters from carbon monoxide and ethers with the aid of concentrated sulfuric acid as catalyst. U.S. Pat. No. 2,135,447 to Woodhouse, discloses the use of hydrogen halides as promoters for carbon black catalysts used in a high-temperature (200–400° C.) high-pressure (preferably about 700 atoms) gas phase preparation of esters from ethers.

STATEMENT OF THE INVENTION

It has now been found that carboxylic esters are produced with improved efficiency by contacting an ether with carbon monoxide in the presence of a water-containing liquid hydrogen fluoride catalyst, at a temperature of from about 10° C. to about 125° C. and a partial pressure of carbon monoxide of from about 1 Kg./cm.$^2$ to about 150 kg./cm.$^2$ and separating the carboxylic ester from the resulting reaction product. This process will be further described below with reference to the attached drawing wherein the single figure represents more or less diagrammatically one form of apparatus suitable for carrying out the process of the invention.

DETAILED DESCRIPTION OF THE INVENTION

HYDROGEN FLUORIDE CATALYST

Pure liquid hydrogen fluoride is not capable of converting an ether with carbon monoxide into an ester. However, water-containing liquid hydrogen fluoride is very active in this respect, the ethers being in general substantially quantitatively converted into esters. The presence of a minor quantity of water is usually sufficient and, accordingly, the liquid hydrogen fluoride preferably contains in the range of from 0.1 percent to 5 percent by weight of water, calculated on hydrogen fluoride. Outstandingly high ester yields are obtained if the liquid hydrogen fluoride used contains in the range of from 1 percent to 3 percent by weight of water, calculated on hydrogen fluoride.

ETHER REACTANT

Ethers which are converted to esters in accordance with the invention comprise those represented by the emperical formula R$^1$-O-R$^2$ wherein R$^1$ and R$^2$ represent the same or different hydrocarbyl groups containing from 1 to about 10 carbon atoms.

Suitable hydrocarbyl groups represented by R$^1$ and R$^2$, consist of aliphatic radicals, cycloaliphatic radicals, aralkyl radicals, and aryl radicals, such as for example methyl, n-butyl, isopropyl, tertiary pentyl, cyclohexyl, cycloheptyl, benzyl, tolyl, xylyl, phenyl, and naphthyl.

Ethers wherein R$^1$ and R$^2$ are both aliphatic radicals of from 1 to 10 carbon atoms are quite suitable, giving high yields of esters. Ethers wherein R$^1$ is a primary alkyl radical of from 1 to 10 carbon atoms and R$^2$ is a tertiary alkyl radical of from 1 to 10 carbon atoms, for example methyl, tertiary butyl ether, are preferred. An ether in which R$^1$ and R$^2$ are identical is converted into an ester of the general formula R$^1$COOR$^2$, wherein the R$^1$ and R$^2$ represent the same organic radical. For example, dimethyl ether is converted into methyl acetate.

An ether in which R$^1$ and R$^2$ are not identical is usually converted into a mixture of esters having the general formulas R$^1$COOR$^2$ and R$^2$COOR$^1$. The ratio of the respective esters formed will depend on the ratio between the rate at which the ether is cleared between the R$^1$ group and the oxygen atom and the rate at which it is cleared between the R$^2$ group and the oxygen atom.

Ethers having two primary alkyl radicals are converted into a mixture of two esters, for example, methyl n-butyl ether, is converted into a mixture of n-butyl acetate and methyl n-valerate, and n-propyl n-butyl ether, is converted into a mixture of n-butyl n-butyrate and n-propyl valerate.

Ethers having one primary and one secondary radical are converted predominantly into primary esters of the general formula R$^2$COOR$^1$ wherein R$^1$ represents the primary and R$^2$ the secondary radical, for example, methyl isobutyl ether is mainly converted into methyl isovalerate and n-propyl isopropyl ether is mainly converted into n-propyl isobutyrate.

Primary tertiary ethers are as a rule substantially completely converted into an ester of the general formula R$^2$COOR$^1$, in which R$^1$ represents the primary and R$^2$ the tertiary radical. For example, methyl tertiary butyl ether is substantially completely converted into the methyl ester of trimethyl-acetic acid and methyl tertiary pentyl ether into the methyl ester of alpha, alpha-dimethyl butanoic acid, no byproducts being formed.

From alkyl aryl ethers the alkyl group is usually split off and an ester is formed of the general formula R$^1$COOR$^2$, in which R$^1$ represents the alkyl and R$^2$ the aryl group. Methyl phenyl ether, for example, is predominately converted into phenyl acetate, and t-butyl phenyl ether into the phenyl ester of n-valeric acid.

Alkyl aralkyl ethers are predominantly converted into esters of the general formula R$^1$COOR$^2$, in which R$^1$ represents an aralkyl group and R$^2$ an alkyl group. For example, methyl benzyl ether is mainly converted into methyl phenylacetate.

A mixture of ethers may be used as a starting material.

CARBON MONOXIDE REACTANT

Preferably, substantially pure carbon monoxide is used. The invention, however, is not restricted thereto, nor to the source of the carbon-monoxide-containing gas used. The gas used may be a mixture of carbon monoxide with one or more inert gases, such as for example hydrogen, nitrogen or gaseous alkanes. The carbon monoxide concentration in such a gas is preferably at least 50 percent by volume.

REACTION CONDITIONS

Carbon monoxide partial pressures varying within a wide range may be used in the present process. As a rule this partial pressure is chosen not lower than 1 kg./cm.$^2$ and not higher than 150 kg./cm.$^2$. Preferably, a carbon monoxide partial pressure in the range of from 5 to 100 kg./cm.$^2$ and in particular in the range of from 10 to 50 kg./cm.$^2$ is applied.

The process according to the present invention may be carried out in a wide temperature range. As a rule the temperature is chosen not below 10° C. and not higher than 125° C. Preferably, the reaction is carried out at a temperature in the range of from 20° C. to 100° C. and in particular in the range of from 40° C. to 80° C.

As a result of the relatively low pressures and temperatures used, the present process has as the advantage that it may be carried out in a reactor of relatively simple construction.

Hydrogen fluoride and ether may be used in a molar ratio varying within wide limits. In order to ensure a sufficiently high reaction rate this ratio is, as a rule, chosen not lower than 1:1, and for economic reasons not higher than 20:1. The said ratio is preferably in the range of from 2:1 to 10:1. At a ratio of about 4:1 a high ester yield is obtained in a relatively short reaction time.

The ester yield is favorably influenced by vigorously stirring the liquid hydrogen fluoride. Therefore, the reaction is preferably carried out in a reactor provided with a stirrer having a power input of at least 0.5 hp. per m.$^3$ and in particular between 1 and 4 hp. per m.$^3$ liquid reactor contents. Mixing is further improved when the reaction is carried out in a reactor provided with one or more baffles. Very good mixing is obtained with a stirred reactor provided with four baffles.

The process according to the invention can be carried out batchwise, semicontinuously or continuously. For each of these embodiments any suitable known technique and apparatus may in principle be used. For a commercial scale process, however, the continuous embodiment is preferred. A preferred continuous embodiment comprises the steps of:

a. introducing into a reactor liquid hydrogen fluoride, the ether to be converted, carbon monoxide and water,
b. separating an ester phase and a substantially ester-free phase from liquid reactor effluent, and
c. recycling at least part of the substantially ester-free phase formed in step (b) to the reactor in step (a).

The separation of the ester phase from the liquid reactor effluent in step (b) may be carried out in any desired manner. In view of the volatility of hydrogen fluoride, the separation in step (b) is preferably carried out with the aid of fractionation. This fractionation preferably comprises the steps of:

b1. separating the reactor effluent by fractionation into an overhead fraction comprising gaseous hydrogen fluoride, and a bottom fraction comprising hydrogen fluoride, ester and water,
b2. cooling the said overhead fraction to obtain liquefied hydrogen fluoride for recycling in step (c),
b3. recovering from the said bottom fraction an ester phase and water-containing liquid hydrogen fluoride, and
b4. recycling at least part of the water-containing liquid hydrogen fluoride obtained in step (b3) to the reactor in step (a).

Although the fractionation can in principle be carried out at any pressure, it is preferably performed at substantially atmospheric or slightly increased pressure. Fractionation at a slightly increased pressure has as an advantage that by using ordinary cooling water, which has a temperature of, for instance, from 10 to 30° C., the gaseous hydrogen fluoride obtained as overhead fraction can be condensed in a simple manner. Fractionation is preferably carried out at a pressure in the range of from 3 to 6 kg./cm.$^2$. If desired, pressures higher than 6 kg./cm.$^2$ may also be used.

The crude reaction product obtained as a bottom fraction in the fractionation contains esters, hydrogen fluoride and water.

The fractionation is preferably carried out in such a manner that the ratio between hydrogen fluoride and water in the bottom fraction substantially corresponds to the azeotropic composition of these compounds. As is known, the hydrogen fluoride water azeotrope contains 38 percent hydrogen fluoride and boils at 112° C. at atmospheric pressure. By removing hydrogen fluoride during fractionation in such an amount that this azeotropic composition is substantially obtained, phase separation occurs in the bottom fraction, resulting in an ester phase and an aqueous hydrogen fluoride phase. By phase separation in a phase separator esters and aqueous hydrogen fluoride can be recovered from the bottom fraction in a simple manner. Preferably, the total amount of this aqueous hydrogen fluoride is recycled to the reactor in step (a).

The ester phase obtained in step (b) may be purified in any desired manner. It may be washed with water to remove water-soluble compounds, particularly traces of hydrogen fluoride. This washing may be carried out in any suitable apparatus. For example, a stirred vessel with or without recirculation of spent wash water may be used. The said washing may also be carried out in a rotating disc contactor. The material to be washed and water are preferably conducted in countercurrent through the said contactor.

The washed material, consisting substantially completely of esters, may further be purified by distillation. This distillation may be carried out at atmospheric but is preferably carried out at subatmospheric pressure, in order to avoid the decomposition of the esters formed. The esters thus purified can, if desired, be further purified according to one or more known techniques.

In step (a) not only a liquid product is removed from the reactor, but also an off-gas which in addition to carbon monoxide mainly contains hydrogen fluoride and gaseous components formed by side reactions in the preparation of the esters or which were passed into the reactor together with the components to be converted. The hydrogen fluoride can, in a simple way, be recovered almost completely from the off-gas by cooling the said off-gas, preferably at the pressure prevailing in the reactor. The liquid hydrogen fluoride thus formed is preferably recycled to the reactor. If desired, the off-gas may be combined with the overhead product obtained in the fractionation in (b1) and then cooled together. This partly purified off-gas, however, cannot as a rule be vented as such to the atmosphere, because the off-gas contains harmful compounds, particularly traves of hydrogen fluoride and carbon monoxide. Hydrogen fluoride is preferably recovered from the reactor off-gas obtained in step (a) by contacting the said off-gas, in particular after cooling and removal of liquefied hydrogen fluoride, with a hydrogen fluoride acceptor. As hydrogen fluoride acceptor are preferably used liquids with satisfactory solvent power for hydrogen fluoride.

According to a very suitable embodiment of the present process the hydrogen fluoride acceptor used is the ether to be converted. The ether used for washing the off-gas is then introduced into the reactor.

If desired, acceptors may be used which chemically bind the hydrogen fluoride. For example, alkaline reacting solutions may be used.

After removal of hydrogen fluoride from the off-gas in the process according to the invention the off-gas is preferably burnt, thus preventing pollution of the air with carbon monoxide and gaseous hydrocarbons.

Referring now to the figure, ether is introduced via valved line 11 into reactor 12. Carbon-monoxide-containing gas is supplied via line 14, and liquid hydrogen fluoride and water are supplied to reactor 12 via valved lines 15 and 15 respectively. Reactor 12 is provided with a stirrer 17 and baffles 19. A liquid mixture of hydrogen fluoride, ester, and water is withdrawn from reactor 12 via line 20 and introduced into fractionation column 21. In column 21 hydrogen fluoride with a minor amount of water is taken overhead. This is condensed and removed via valved line 22 or preferably recycled to reactor 12 via line 24. From column 21, a bottom fraction consisting of the ester and an azeotropic mixture of hydrogen fluoride is withdrawn via line 25 and conducted to phase separator 26 where a lower phase containing azeotropic hydrogen fluoride/water is separated and may be removed via valved line 27, but preferably is recycled to reactor 12 via valved line 29. The upper phase from separator 26 containing crude ester (ester contaminated with hydrogen fluoride) may be removed via valved line 30 but preferably is conducted via valved line 31 to mixing vessel 32 in which the ester is washed with water. This water may be supplied by line 33 but preferably is in part supplied as a recycle stream via line 34. Mixing vessel 32 is provided with stirrer 35. The mixed liquids are withdrawn from vessel 32 via line 36 and introduced into phase separator 37 from which an upper phase consisting of ester product is removed via line 39. A lower phase consisting of rinse water with hydrogen fluoride, may be removed via line 40, preferably a portion of rinse water is recycled via valved line 34.

An off-gas containing hydrogen fluoride and carbon monoxide is withdrawn from reactor 12 and may be discharged via valved line 41 but preferably is conducted via valved line 42 to scrubber 44 in which it is scrubbed countercurrently with ether introduced into scrubber 44 via valved line 45. Ether containing hydrogen fluoride is withdrawn from scrubber 44 via line 46 and partly recirculated to line 45 via line 47 and partly introduced via line 49 into line 11. Hydrogen-fluoride-free off-gas is discharged from scrubber 44 via line 50.

The process of the invention is further illustrated by way of the following example.

EXAMPLE

A continuous experiment was carried out in a reactor as shown in the Figure and made of "Hastelloy C" (a registered trade mark). The reactor had a volume of 0.25 liter and was provided with a mechanical stirrer and four baffles. Pure carbon monoxide was charged at a pressure of 25 kg./cm.$^2$. The temperature of the reactor contents was maintained at 60° C. The stirrer speed was 1,000 revolutions per minute.

The reactor was continuously supplied with 150 g./h. of methyl tertiary butyl ether and liquid hydrogen fluoride containing 2 percent w of water in a molar ratio hydrogen fluoride: ether = 4.4:1. The mean residence time of the material in the reactor was 1 hour.

Hydrogen fluoride was distilled from the liquid leaving the reactor, liquified by indirect cooling with cooling water and recycled to the reactor. The bottom fraction consisting of methyl trimethyl acetate and an azeotropic mixture of hydrogen fluoride and water was separated in a settling tank into an ester phase and hydrogen fluoride-water phase. The latter mixture was recycled to the reactor. The ester phase was washed with water in a propeller-stirred mixing vessel and, after separation of the wash water from the washed ester, it was found that the starting ether had been quantitatively converted into methyl trimethyl acetate, 197 g. of the ester being produced per hour.

We claim as our invention:

1. The process for the synthesis of carboxylic esters which comprises reacting an ether reactant represented by the empirical formula $R^1$-O-$R^2$, wherein $R^1$ and $R^2$ represent the same or different hydrocarbyl groups containing from 1 to 10 carbon atoms, in the liquid phase, with carbon monoxide in the presence of water-containing liquid hydrogen fluoride catalyst, said water concentration being 0.1 percent to 5 percent by weight based on the weight of the hydrogen fluoride at a temperature of from about 10° C. to about 125° C. and at a carbon monoxide partial pressure of from about 1 kg./cm.$^2$ to about 150 kg./cm.$^2$ and thereafter separating carboxylic ester from the reaction mixture.

2. The process in accordance with claim 1 wherein the molar ratio of hydrogen fluoride catalyst to ether is between about 1 to 1 and about 20 to 1.

3. The process in accordance with claim 2 wherein said reaction is executed at a temperature between about 20° C. and 80° C. and a carbon monoxide partial pressure between about 5 and 100 kg./cm.$^2$.

4. The process in accordance with claim 3 wherein said molar ratio of hydrogen fluoride catalyst to ether is between about 2 to 1 and about 10 to 1 and said hydrogen fluoride catalyst contains from about 1 percent to about 3 percent by weight of water.

5. The process in accordance with claim 4 wherein said $R^1$ and $R^2$ each represent aliphatic radicals of from 1 to 10 carbon atoms.

6. The process in accordance with claim 5 wherein said $R^1$ is a primary alkyl radical of from 1 to 10 carbon atoms and said $R^2$ is a tertiary alkyl radical of from 1 to 10 carbon atoms.

7. The continuous process for the production of carboxylic esters from carbon monoxide and an ether represented by the empirical formula $R^1$-O-$R^2$, wherein $R^1$ and $R^2$ represent the same or different hydrocarbyl groups containing from 1 to 10 carbon atoms, which comprises subjecting said carbon monoxide and ether to vigorous agitation in a reaction zone in the presence of a water-containing liquid hydrogen fluoride catalyst said water concentration being 0.1 percent to 5 percent by weight based on the weight of the hydrogen fluoride at a temperature of from about 10° C. to about 125° C. and a carbon monoxide partial pressure of from about kg./cm.$^2$ to about 150 kg./cm.$^2$ thereby reacting said carbon-monoxide and ether to form esters, continuously removing from said reaction zone reaction product comprising esters, water and hydrogen fluoride, subjecting said reaction product to fractionation thereby separating a vapor fraction comprising hydrogen fluoride, and a liquid fraction comprising esters, water and hydrogen fluoride, subjecting said liquid fraction to phase separation thereby recovering a phase comprising esters and a phase comprising hydrogen fluoride and water.

8. The process in accordance with claim 7 wherein at least a portion of said vapor fraction comprising hydrogen fluoride is condensed and returned to the reaction zone.

9. The process in accordance with claim 8 wherein said phase comprising ester is further purified by washing with water.

10. The process in accordance with claim 8 wherein said water-containing liquid hydrogen fluoride contains from about 1 percent to about 3 percent by weight of water and the molar ratio of hydrogen fluoride catalyst to ether is between about 2 to 1 and about 10 to 1.

11. The process in accordance with claim 10 wherein said $R^1$ and $R^2$ each represent aliphatic radicals of from 1 to 10 carbon atoms.

12. The process in accordance with claim 11 wherein $R^1$ is a primary alkyl radical of from 1 to 10 carbon atoms and said $R^2$ is a tertiary alkyl radical of from 1 to 10 carbon atoms.

13. The process in accordance with claim 10 wherein said ether is methyl tertiary butyl ether and the ester formed is methyl trimethylacetate.

P-1705 (US)
WHB:mp

PO-1050 (5/69)

UNITED STATES PATENT OFFICE
CERTIFICATE OF CORRECTION

Patent No. 3,607,914           Dated September 21, 1971

Inventor(s)  Bernhard Stouthamer and Arien Kwantes

It is certified that error appears in the above-identified patent and that said Letters Patent are hereby corrected as shown below:

On the front page, left column, after the line

"New York, N.Y." should be inserted the lines

-- [32]   Priority    Nov. 11, 1968
   [33]               Great Britain
   [31]               53317/68 --.

Signed and sealed this 29th day of February 1972.

(SEAL)
Attest:

EDWARD M. FLETCHER, JR.　　　　　　ROBERT GOTTSCHALK
Attesting Officer　　　　　　　　　　Commissioner of Patents